United States Patent
Lu (10) Patent No.: US 10,001,109 B2
(45) Date of Patent: Jun. 19, 2018

(54) MULTIFUNCTIONAL WIND POWER GREEN-ENERGY APPARATUS

(71) Applicant: TRUE TEN INDUSTRIAL CO., LTD., Taichung (TW)

(72) Inventor: Shun-Tsung Lu, Taichung (TW)

(73) Assignee: TRUE TEN INDUSTRIAL CO., LTD., Taichung (TW)

( * ) Notice: Subject to any disclaimer, the term of this patent is extended or adjusted under 35 U.S.C. 154(b) by 0 days. days.

(21) Appl. No.: 15/343,223

(22) Filed: Nov. 4, 2016

(65) Prior Publication Data

US 2018/0128244 A1 May 10, 2018

(51) Int. Cl.
| | | |
|---|---|---|
| F03D 9/00 | (2016.01) | |
| F03D 1/02 | (2006.01) | |
| F03D 9/25 | (2016.01) | |
| F03D 9/28 | (2016.01) | |
| F03D 13/20 | (2016.01) | |
| F03D 15/00 | (2016.01) | |

(52) U.S. Cl.
CPC ............. *F03D 9/002* (2013.01); *F03D 1/02* (2013.01); *F03D 9/001* (2013.01); *F03D 9/25* (2016.05); *F03D 9/28* (2016.05); *F03D 13/20* (2016.05); *F03D 15/00* (2016.05)

(58) Field of Classification Search
CPC ... F03D 9/002; F03D 9/26; F03D 9/28; F03D 13/20; F03D 1/02; F03D 15/10
USPC .................................................. 290/44, 55
See application file for complete search history.

(56) References Cited

U.S. PATENT DOCUMENTS

| | | | | |
|---|---|---|---|---|
| 1,369,596 A | * | 2/1921 | Yanacopoulos | F03D 9/17 290/44 |
| 2,403,564 A | * | 7/1946 | Stein | F03D 1/02 290/44 |
| 2,539,862 A | * | 1/1951 | Rushing | F03D 9/18 192/104 R |
| 3,806,733 A | * | 4/1974 | Haanen | F03B 17/02 290/44 |
| 4,280,061 A | * | 7/1981 | Lawson-Tancred | F03D 7/02 290/44 |

(Continued)

FOREIGN PATENT DOCUMENTS

DE 102012020052 B3 * 4/2014 ............... F03D 1/02

*Primary Examiner* — Julio C Gonzalez
(74) *Attorney, Agent, or Firm* — Leong C. Lei (57) ABSTRACT

A multifunctional wind power green-energy apparatus generally includes a carrying base, a plurality of wind power generation devices mounted on the carrying base and includes a plurality of blade sections, and at least one electricity accumulation device, water pumping motor, and the air storage device arranged at one side of the carrying base and electrically connected with the wind power generation devices. With such a structural arrangement, through simple combination of the carrying base and the wind power generation devices, terrain limitation conditions for availability of wind power green energy can be reduced to the least for applications to diversified environments. Through operations in combination with the electricity accumulation device, the water pumping motor, and the air storage device, accumulation of electrical energy or direct use of the energy can be available. As such, the utilization of the wind power generation devices can be improved.

7 Claims, 8 Drawing Sheets

(56) References Cited

U.S. PATENT DOCUMENTS

| | | | | |
|---|---|---|---|---|
| 4,333,018 A | * | 6/1982 | Bottrell | F03D 7/0204 290/44 |
| 5,472,311 A | * | 12/1995 | Davis | F03D 3/0454 415/2.1 |
| 2004/0096327 A1 | * | 5/2004 | Appa | F03D 1/025 416/1 |
| 2009/0058095 A1 | * | 3/2009 | McClintic | F03D 7/0236 290/55 |
| 2011/0018269 A1 | * | 1/2011 | Moser | F03D 7/0204 290/44 |
| 2014/0105721 A1 | * | 4/2014 | Koko | F03D 1/02 415/1 |

\* cited by examiner

MULTIFUNCTIONAL WIND POWER GREEN-ENERGY APPARATUS

TECHNICAL FIELD OF THE INVENTION

The present invention relates to a multifunctional wind power green-energy apparatus, and more particular to a multifunctional wind power green-energy apparatus that is not subject to constraints of terrain and comprises a wind power generator that can be easily installed and used for direct application of electrical power to functions including electricity accumulation, water pumping, and gas storage.

DESCRIPTION OF THE PRIOR ART

In view of earth resources being gradually consumed up, green energy is now attracting attention and governments have put budgets in exploiting wind power and solar energy. Concerning the development of wind power energy, huge fixed wind power generation devices have been built in seashore where rich wind power energy is available. Such devices involve windmill blades or vanes that are as long as tens of meters. This requires a great expense for building and installation, and also heavy machinery is needed for conducting large-sized civil engineering for the installation of the wind power generation device. The building cost is high, making it not suitable for sites where wind power resources are small. In addition, moving is not possible after the construction has been done.

Although such wind power generation devices may generate and supply a relatively large amount of electrical power, they require relatively strong wind power for driving. The electrical power so generated is often stored for subsequent use. Although it is common that the wind power generation device is built in combination with water pumping facilities, the application is subject to constraint of terrains and can only be available for specific sites including sea surface, aquaculture ponds, and riversides and is not good as a substitute for miniature power generator. This makes it not popular for use by general people. Using the energy generated by wind power generation facilities to drive air pumping devices that are used for increase oxygen contents in water is also good for aquaculture ponds that are located at sites of low altitudes and/or insufficient wind power resources, for it may lead to instable gas output of oxygen generation devices.

There are certain problems and drawbacks to be improved for the applications of the conventional wind power generation devices:

(1) The conventional wind power generation device is bulky in size and expensive in cost and is generally subject to constraint of terrain or geographic conditions.

(2) Applications to operation in combination with water pumping facilities are also subject to constraints of terrain and are available for a limited range of use.

(3) Applications to operation in combination with air pumping facilities may lead to issues of instability of gas output.

(4) Trouble-free applications, without any problems caused by terrain issues, for use in combination with both water pumping facilities and air pumping facilities have never been available before.

SUMMARY OF THE INVENTION

In view of the above-described problems, the present invention aims to provides a multifunctional wind power green-energy apparatus that comprises a wind power generator that is not subject to constraints of terrain and can be easily installed and used for direct application of electrical power to functions including electricity accumulation, water pumping, and gas storage.

The primary purpose of the present invention is that energy generated through wind power can be used to drive water pumping facilities and air storage facilities and can also be used to accumulate electrical energy in an electricity accumulation device.

A secondary purpose of the present invention is to provide a simple structure for easy assembly and applications without being constrained by terrains.

To achieve the above purposes, the present invention comprises, structurally, a carrying base, wherein the carrying base is provided thereon with a plurality of wind power generation devices, and each of the wind power generation devices comprises a plurality of blade sections, the carrying base being provided, at one side thereof, with at least one electricity accumulation device electrically connected with the wind power generation devices, the carrying base being also provided thereon with at least one water pumping motor electrically connected with the wind power generation devices, and the carrying base being further provided, at one side thereof, with at least one air storage device electrically connected with the wind power generation device. When a user applies the present invention as a green energy driving device, due to the simple structural arrangement, assembly can be made in field at a designated site without subject to any constraint of terrains. In use, the operation of the blade sections can be applied to drive the operation of wind power generation devices to generate electrical energy that can be stored in the electricity accumulation device, or alternatively, a water pumping motor or air storage device can be directly operated thereby or be selectively assisted with electrical energy stored so that the wind power generation devices may be used to supply operation power to the water pumping motor or the air storage device, allowing for unconstrained use by the users to thereby improve the utilization of the wind power generation devices.

With the above-described technical solution, the drawbacks of the prior art wind power generation devices that the size is bulky, the expenditure is high, construction and installation are subject to constraints of terrain, and availability for operative combination with water pumping and air storage is not possible can be overcome and the above-described advantages can be effectively achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
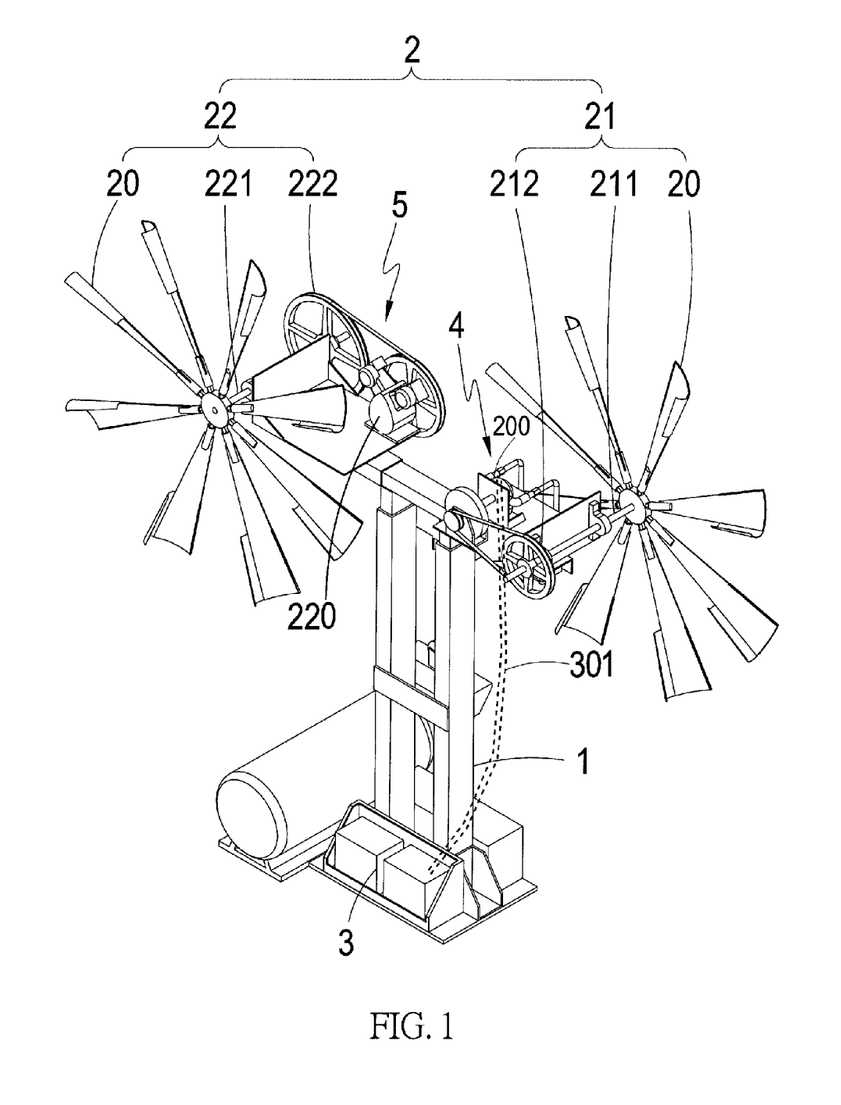
FIG. 1 is a perspective view of a preferred embodiment of the present invention.
Figure 2:
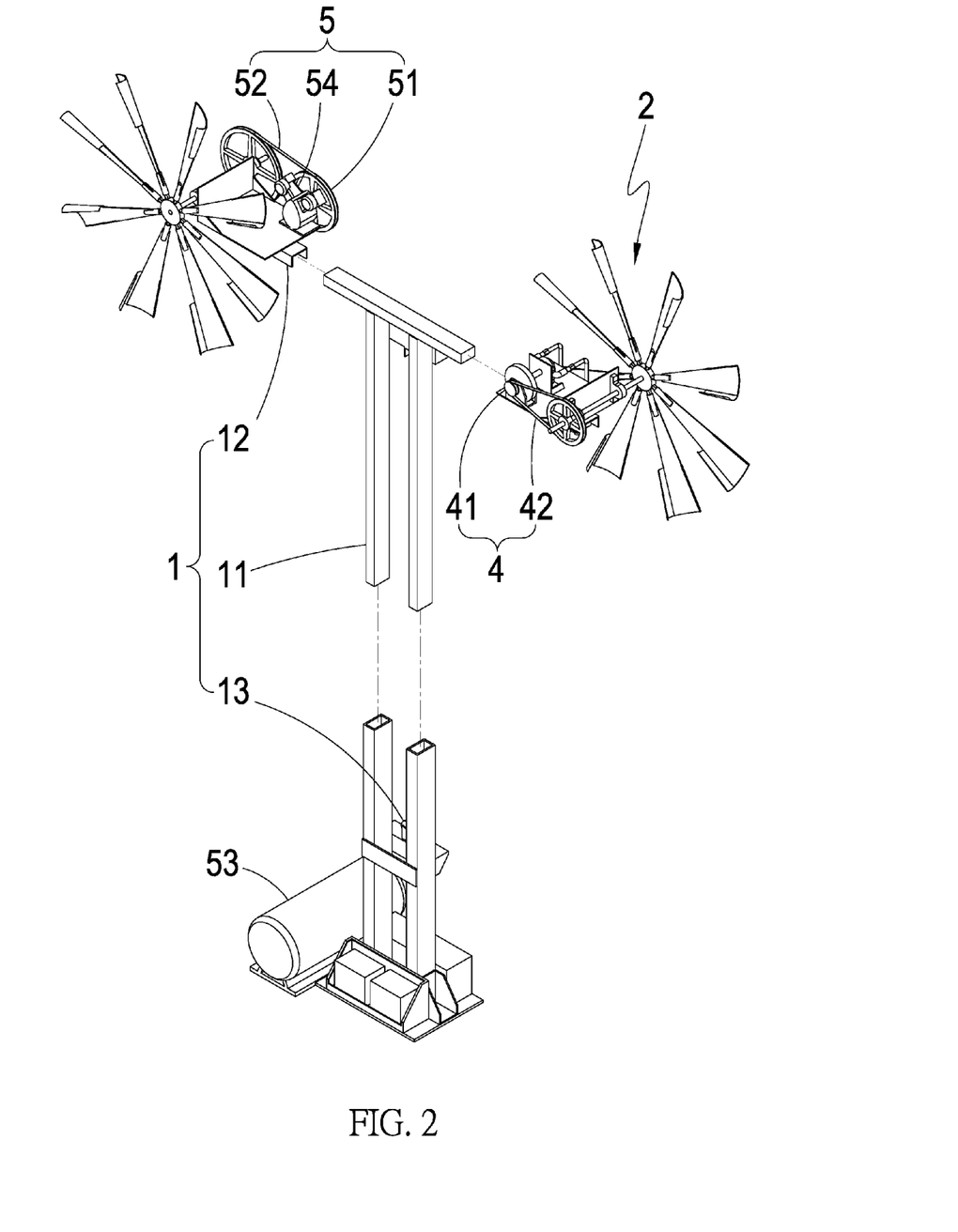
FIG. 2 is an exploded view of the preferred embodiment of the present invention.
Figure 3:
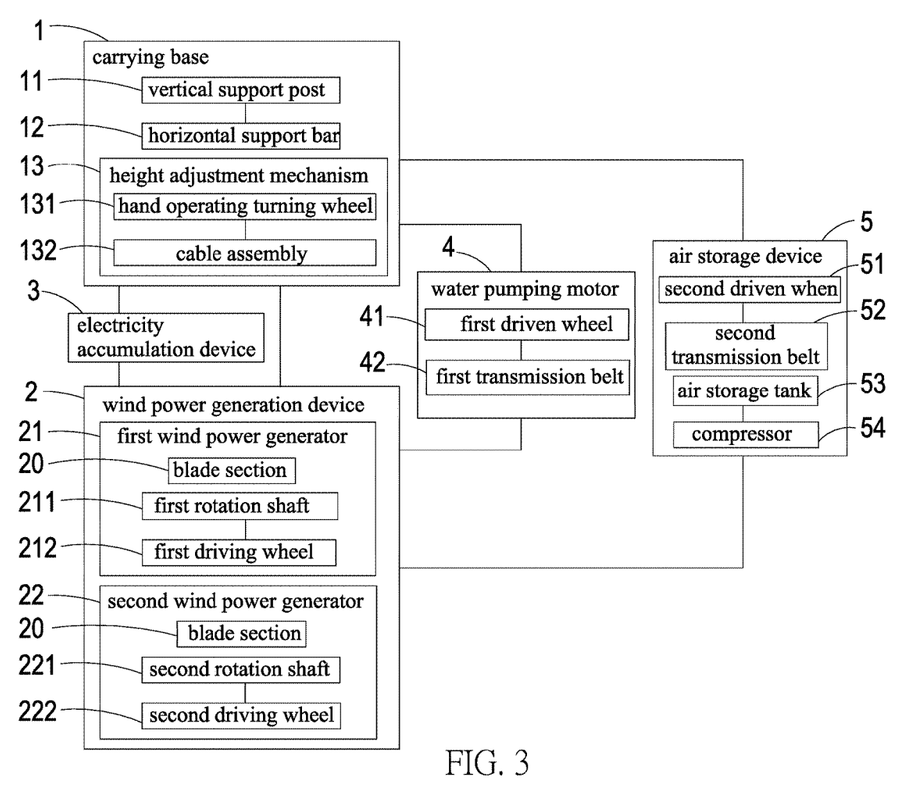
FIG. 3 is a block diagram illustrating a structural configuration of the preferred embodiment of the present invention.
Figure 4:
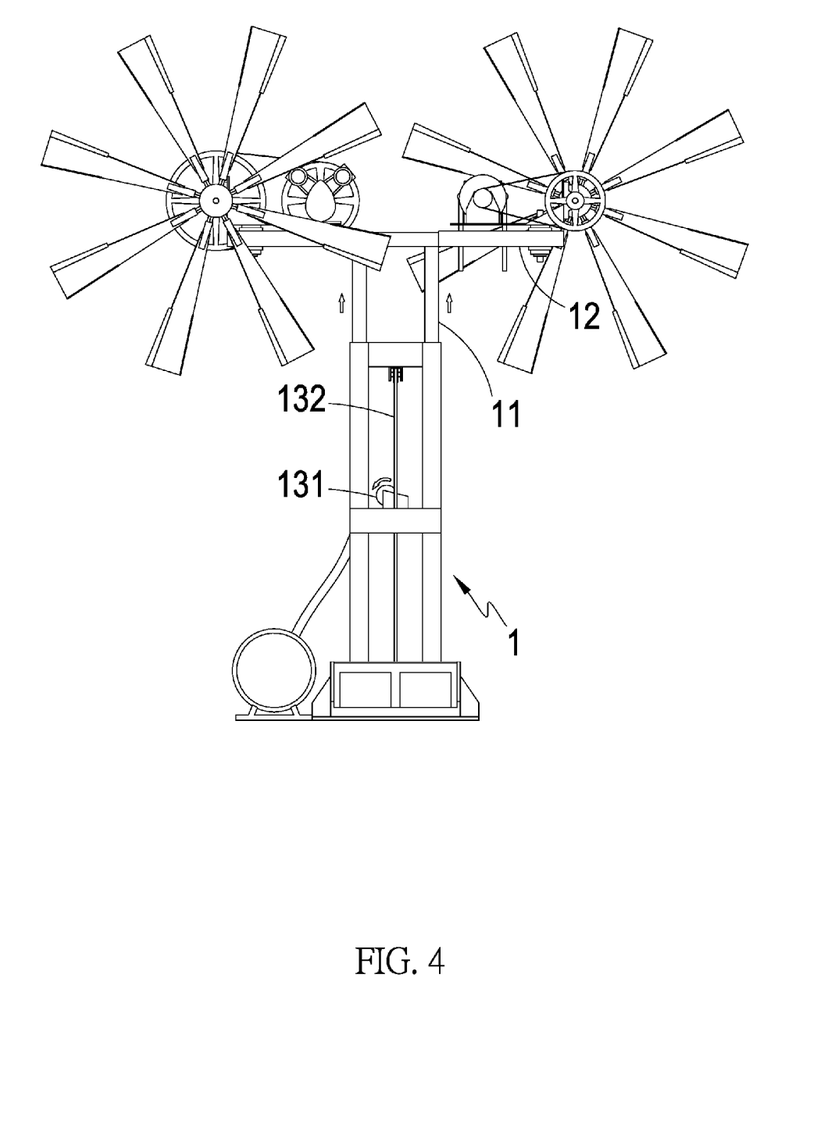
FIG. 4 is a schematic view illustrating an application of the preferred embodiment of the present invention.
Figure 5:
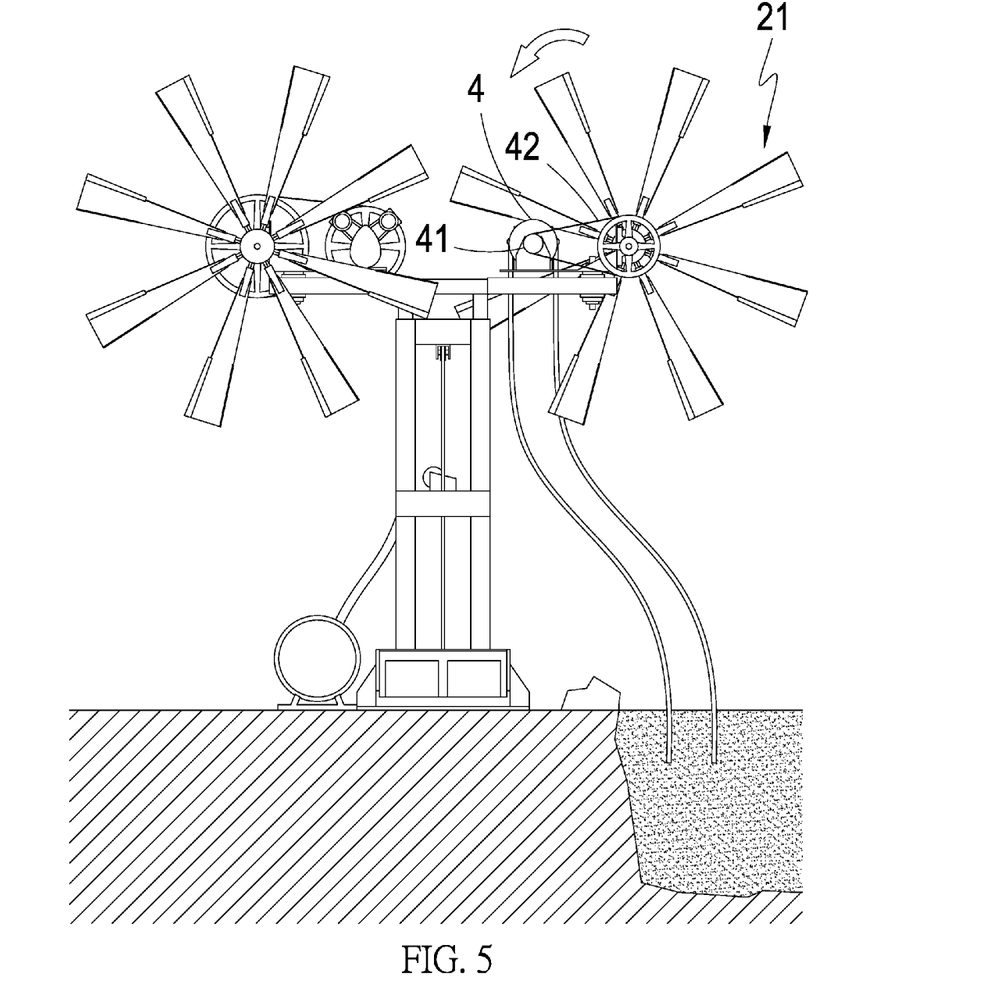
FIG. 5 is another schematic view illustrating the application of the preferred embodiment of the present invention.
Figure 6:
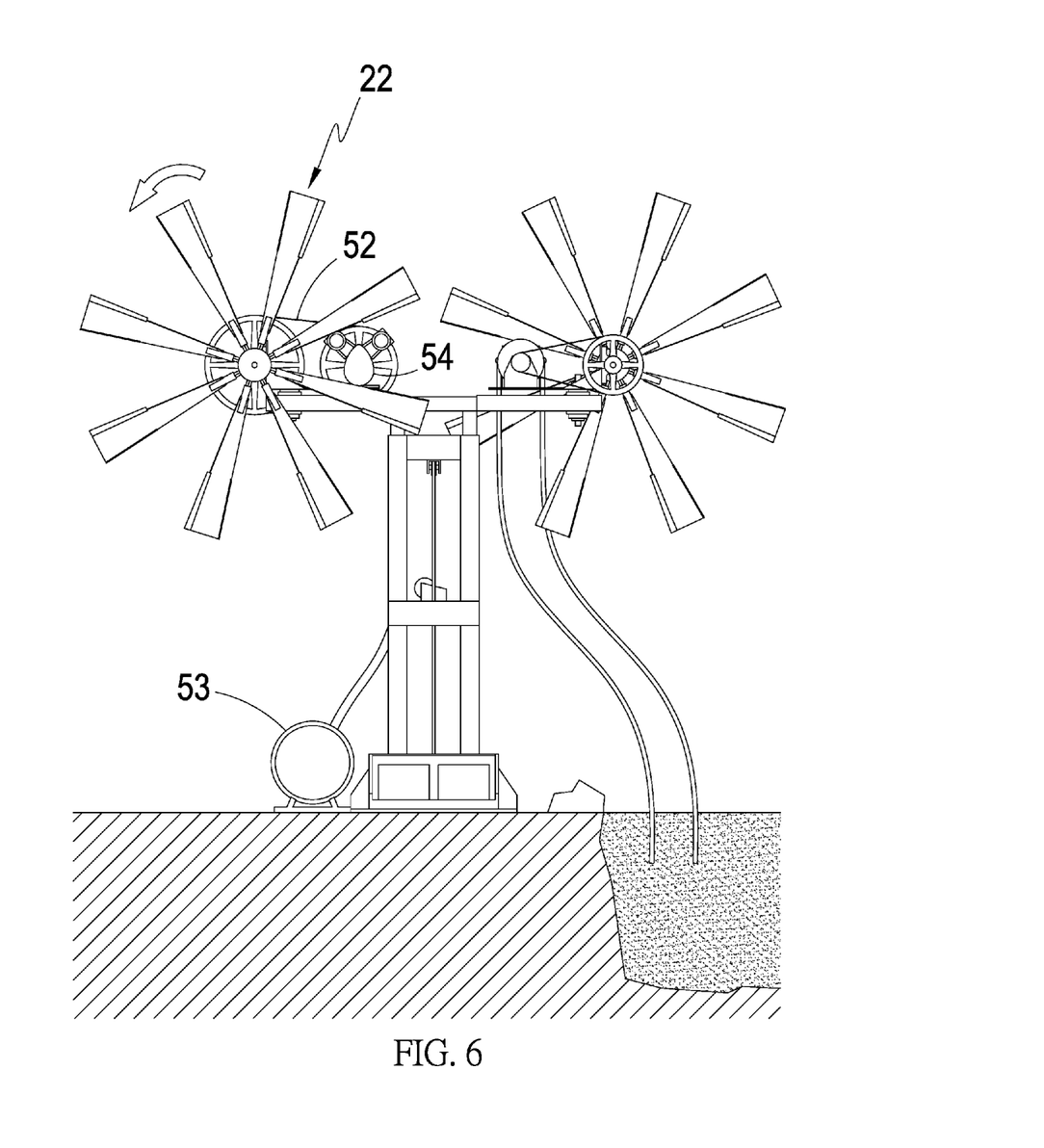
FIG. 6 is a further schematic view illustrating the application of the preferred embodiment of the present invention.

As shown in FIGS. 1-3, the present invention comprises:

a carrying base 1, wherein the carrying base 1 comprises a plurality of vertical support posts 11 and a plurality of horizontal support bars 12 that are fixed, in a horizontal manner, to one side of the vertical support posts 11 and the carrying base 1 comprises a height adjustment mechanism 13 for adjusting heights of wind power generation devices 2 that will be described hereinafter, wherein the height adjustment mechanism 13 comprises a hand operating turning wheel 131 and at least one cable assembly 132 operatively coupled to the hand operating turning wheel 131 for retaining the carrying base 1 at a predetermined height;

a plurality of wind power generation devices 2 mounted on the carrying base, wherein each of the wind power generation devices 2 comprises a plurality of blade sections 20 and each of the wind power generation devices 2 comprises a first wind power generating assembly 21 and a second wind power generating assembly 22 that are respectively set at two opposite ends of the carrying base 1, wherein the first wind power generating assembly 21 comprises a first generator 200, a first rotation shaft 211 that is rotatably set at a central axis of the blade sections 20 and a first driving wheel 212 mounted to an end of the first rotation shaft 211 that is distant from the blade sections 20; and the second wind power generating assembly 22 comprises a second generator 220 a second rotation shaft 221 that is rotatably set at a central axis of the blade sections 20 and a second driving wheel 222 mounted to an end of the second rotation shaft 221 that is distant from the blade sections 20;

at least one electricity accumulation device 3 that is arranged at one side of the carrying base 1 and is electrically connected with the wind power generation devices 2 by means of a cable 301;

at least one hydraulic motor 4 that is mounted to the carrying base 1 and is electrically connected with the wind power generation devices 2, wherein the hydraulic motor 4 comprises a first driven wheel 41 and a first transmission belt 42 coupled between the first driving wheel 212 and the first driven wheel 41; and at least one air storage device 5 that is mounted on the carrying base 1 and is electrically connected with the wind power generation devices 2, wherein the air storage device 5 comprises a second driven wheel 51 and a second transmission belt 52 coupled between the second driving wheel 222 and the second driven wheel 51, and wherein the air storage device 5 comprises an air storage tank 53 and a compressor 54 mounted to the air storage tank 53 or the carrying base 1.

The above description provides an understanding of the structure of the present invention and with such a structural arrangement, the present invention achieves advantages of being used without being constrained by terrains and being easily assembled/installed and used and allowing for direct application of electrical power to functions of electricity accumulation, water pumping, and gas storage. Detailed illustration will be provided below.

As shown in FIGS. 1-6, according to the present invention, the carrying base 1 is formed by fixedly mounting a plurality of vertical support posts 11 and a plurality of horizontal support bars 12 together. Thus, before assembly, they are just in the forms of separate bars and posts that can be easily transported and occupy no excessive space. After assembly, the overall size is much smaller than the conventional large-sized wind power generators and can be directly installed at poor terrains, such as high mountains, seashore, and offshore islands to help provide energy necessary for urban country areas. Further, according to the sites of installation, the height adjustment mechanism 13 can be operated to adjust the height of the horizontal support bars 12 in order to vary the height of the wind power generation devices 2. The adjustment can be conducted by directly operating the hand operating turning wheel 131 with hands so that the cable assembly 132 is caused to drive the vertical support posts 11 that are telescopically structured to take relative movement among parts thereof so as to achieve a purpose of extension and/or contraction.

In an actual operation of the wind power generation devices 2, according to the needs of users, electrical power generated thereby can be accumulated in the electricity accumulation device 3 or the rotation of the first wind power generating assembly 21 can be used, through the first rotation shaft 211 driving the first driving wheel 212 to rotate and further through the first transmission belt 42 driving the first driven wheel 41 to rotate, so as to have the hydraulic motor 4 driven by and operated with the first wind power generating assembly 21 (or additional assistance being provided with electrical energy supplied from the electricity accumulation device 3), or alternatively, the rotation of the second wind power generating assembly 22 can be used, through the second rotation shaft 221 driving the second driving wheel 222 to rotate and further through the second transmission belt 52 driving the second driven wheel 51 to rotate, so as to have the compressor 54 driven by and operated with the second wind power generating assembly 22 (or additional assistance being provided with electrical energy supplied from the electricity accumulation device 3) to supply and store compressed air in the air storage tank 53.

Figure 7:
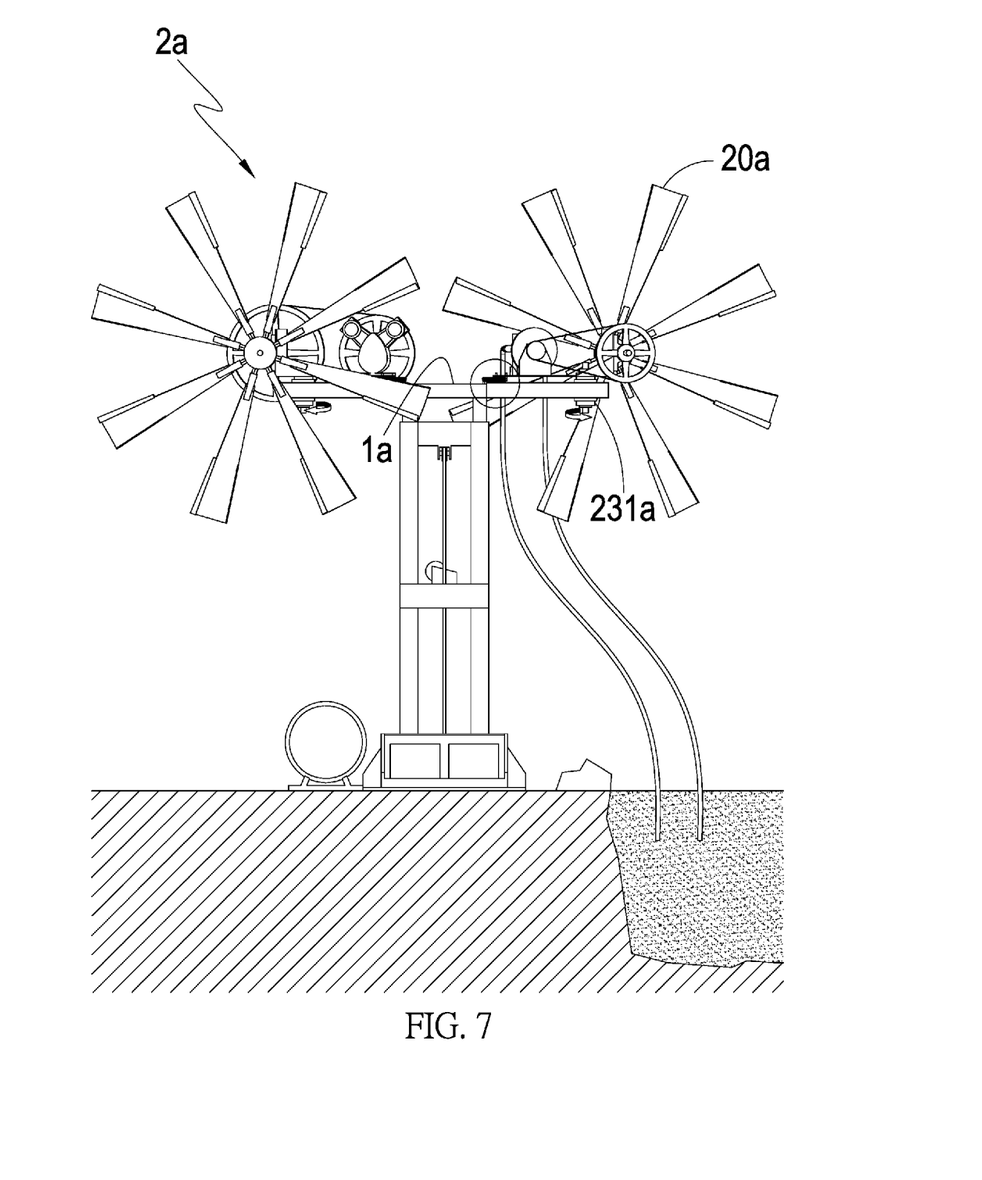
FIG. 7 is a schematic view illustrating another embodiment of the present invention.
Figure 8:
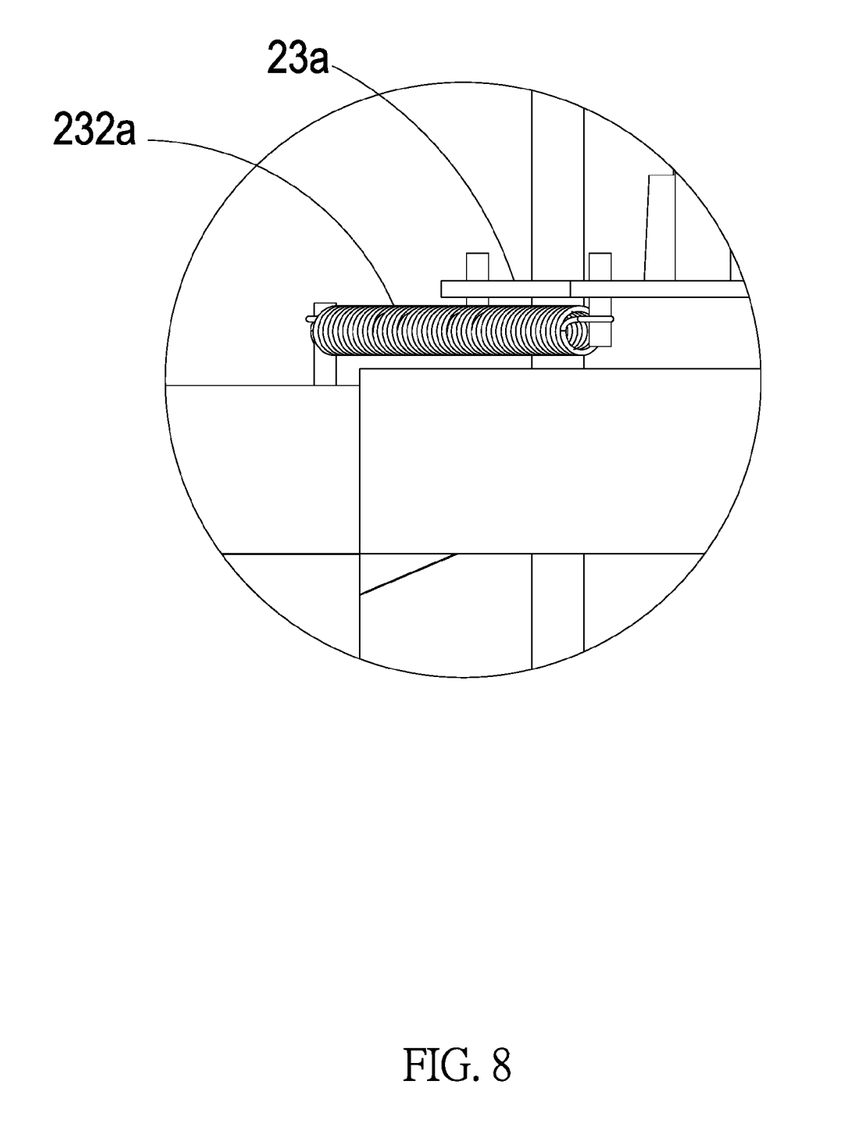
FIG. 8 is an enlarged view of a part of the present invention shown in FIG. 7.

As shown in FIGS. 7 and 8, each of the wind power generation devices 2a may alternatively comprise a swing base 23a that receives the wind power generation device 2a mounted thereto, a rotation member 231a rotatably mounted to the swing base 23a, and a plurality of elastic elements 232a having two ends respectively coupled to the swing base 23a and the carrying base 1a. When the wind power generation devices 2a receive winds acting thereon and are thus operated, in addition to the rotation of the blade sections 20a, an inclined pushing force may be induced according to an included angle between a front surface of the wind power generation devices 2a and an incoming wind so that the wind power generation devices 2a and the swing base 23a are caused to rotate about an axis defined by the rotation member 231a. However, due to a pulling force tension generated by the elastic elements 232a, the swing base 23a is prevented from further rotation in that direction and is pulled back by the spring force of the elastic elements 232a so that the wind power generation devices 2a are caused to swing back and forth, reciprocally. As such, when the wind power generation devices 2a receive a relatively strong wind acting thereon, cushioning may be provided with such a structural arrangement to reduce the potential risk of damage to the structure and thus extending the service life thereof.

Thus, with reference to all the drawings, compared to the prior art, the use and operation of the present invention provide the following advantages:

(1) The structure and simple, the assembly is easy, and applications can be made to all kinds of environments and terrains.

(2) The use of the power from the wind power generation devices 2 can be diversified according to the needs of the users for purposes of electricity accumulation, water pumping and air storage.

(3) The wind power generation devices 2a demonstrates an effect of alleviating stress induced by improper wind receiving angles so as to extend the service life thereof.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multifunctional wind power green-energy apparatus, comprising:
   a carrying base;
   a plurality of wind power generation devices mounted on the carrying base, each of the wind power generation devices comprising a plurality of blade sections;
   at least one electricity accumulation device arranged at one side of the carrying base and electrically connected with the wind power generation devices;
   at least one hydraulic motor arranged on the carrying base and electrically connected with the wind power generation devices; and
   at least one air storage device arranged at one side of the carrying base and electrically connected with the wind power generation devices;
   wherein each of the wind power generation devices comprises a first wind power generating assembly and a second wind power generating assembly respectively mounted to two opposite ends of the carrying base, the first wind power generating assembly comprises a first generator, a first rotation shaft rotatably set at a central axis of the blade sections and a first driving wheel mounted to an end of the first rotation shaft that is distant from the blade sections, and the second wind power generating assembly comprises a second generator, a second rotation shaft rotatably set at a central axis of the blade sections and a second driving wheel mounted to an end of the second rotation shaft that is distant from the blade sections, and the hydraulic motor comprises a first driven wheel and a first transmission belt coupled between the first driving wheel and the first driven wheel.

2. The multifunctional wind power green-energy apparatus according to claim 1, wherein the air storage device comprises a second driven wheel and a second transmission belt coupled between the second driving wheel and the second driven wheel.

3. The multifunctional wind power green-energy apparatus according to claim 1, wherein the air storage device comprises an air storage tank and a compressor mounted on the air storage tank or the carrying base.

4. The multifunctional wind power green-energy apparatus according to claim 1, wherein the carrying base comprises a height adjustment mechanism that is operable to adjust a height of the wind power generation devices.

5. The multifunctional wind power green-energy apparatus according to claim 4, wherein the height adjustment mechanism comprises a hand operating turning wheel and at least one cable assembly operatively coupled to the hand operating turning wheel for retaining the carrying base at a predetermined height.

6. The multifunctional wind power green-energy apparatus according to claim 1, wherein the carrying base comprises a plurality of vertical support posts and a plurality of horizontal support bars mounted to one side of the vertical support posts in a horizontal manner.

7. The multifunctional wind power green-energy apparatus according to claim 1, wherein each of the wind power generation devices comprises a swing base on which the wind power generation device is mounted, a rotation member rotatably mounted to the swing base, and a plurality of elastic elements having two ends respectively coupled to the swing base and the carrying base.

* * * * *